United States Patent [19]

French

[11] E Re. 30,518

[45] Reissued Feb. 17, 1981

[54] PNEUMATIC TIRE WEAR INDICATING TREAD PATTERN

[75] Inventor: Tom French, Sutton Coldfield, England

[73] Assignee: Dunlop Holdings Limited, Birmingham, England

[21] Appl. No.: 16,834

[22] Filed: Mar. 2, 1979

Related U.S. Patent Documents

Reissue of:

[64] Patent No.: 3,653,422
Issued: Apr. 4, 1972
Appl. No.: 834,714
Filed: Jun. 19, 1969

[30] Foreign Application Priority Data

Jun. 29, 1968 [GB] United Kingdom ..... 31199/68

[51] Int. Cl.[3] ..... B60C 11/00

[52] U.S. Cl. ..... 152/209 R; 152/330 A

[58] Field of Search ..... 152/209 R, 209 D, 109 NW, 152/209 NT, 330 A

[56] References Cited

U.S. PATENT DOCUMENTS

| | | | |
|---|---|---|---|
| 1,093,310 | 4/1914 | Carkhuff | 152/209 |
| 1,876,016 | 9/1932 | Pederson | 152/209 |
| 2,102,784 | 12/1937 | Bridges | 152/330 |
| 2,164,819 | 7/1939 | Hick et al. | 152/209 |
| 2,246,479 | 6/1941 | Schrank | 152/209 |
| 2,644,984 | 7/1953 | Crooker | 425/28 D |
| 2,679,663 | 6/1954 | Sahwenker et al. | 425/28 D |
| 2,706,509 | 4/1955 | White | 152/330 A |
| 2,732,589 | 1/1956 | Steadman | 425/31 D |
| 2,756,460 | 7/1956 | Heintz | 425/28 D |
| 2,770,013 | 11/1956 | Crooker | 425/28 D |
| 2,848,744 | 8/1958 | Crooker | 425/28 D |
| 2,896,281 | 7/1959 | Miller et al. | 425/117 |
| 3,432,888 | 3/1969 | Brierley | 425/28 D |
| 3,467,989 | 9/1969 | Youngblood et al. | 425/36 |
| 3,546,749 | 12/1970 | Wissel | 425/35 |
| 3,553,790 | 1/1971 | Brobeck et al. | 425/35 |

FOREIGN PATENT DOCUMENTS

| | | | |
|---|---|---|---|
| 631215 | 5/1936 | Fed. Rep. of Germany | 152/330 |
| 1203290 | 7/1959 | France | 425/28 D |
| 1294744 | 4/1962 | France | 152/330 |
| 1061564 | 3/1967 | United Kingdom | 152/330 |

*Primary Examiner*—Michael W. Ball
*Attorney, Agent, or Firm*—Stevens, Davis, Miller & Mosher

[57] ABSTRACT

A pneumatic tire and moulding matrix therefore, the tire tread incorporating a traction pattern which changes distinctively when only a predetermined amount of tread rubber remains, thus warning the tire user that his tire is approaching the legal or safe limit and will soon have to be replaced or retreaded.

3 Claims, 4 Drawing Figures

PNEUMATIC TIRE WEAR INDICATING TREAD PATTERN

Matter enclosed in heavy brackets [ ] appears in the original patent but forms no part of this reissue specification; matter printed in italics indicates the additions made by reissue.

This invention relates to pneumatic tires.

According to the invention a pneumatic tire comprises a tread provided with at least one main drainage groove and a first, radially outer, and a second, radially inner, pattern each comprising one or more radially-disposed slots, sipes, grooves, incisions, holes or the like, the first pattern changing to the second pattern at a level situated radially inwardly of and substantially parallel to the tread ground-contacting surface of the tire, said level being a predetermined amount less than the depth of the main drainage groove, the second pattern being distinctively different from the first and comprising a wholly radial continuation of part only of said first pattern.

Preferably the second pattern is substantially undetectable from the exterior of the tire until at least a portion of the tread equal in depth to the first pattern has been worn away.

Preferably the said predetermined amount is somewhat greater e.g. 1 mm. greater, than the minimum tread pattern depth allowed under local laws or regulations, e.g. 1 mm. or 2 mm., so that adequate prior warning is given to a tire user that the legal limit of wear is approaching.

The second pattern is preferably so distinctively different from the first pattern that the tire user's mind is directly associated with the fact that in due time the tire will become unsafe or illegal if it is continued to be used and that it should be changed. For example, the second pattern may be in the form of a warning word or several warning words repeated around the tire circumference and/or across part at least of the tire tread width.

The invention also includes a pneumatic tire as described in any of the preceding paragraphs in which said second pattern changes to a third pattern, and perhaps to subsequent patterns, below the tread ground-contacting surface.

All of the patterns previously referred to are preferably formed by moulding, but any other suitable method e.g. cutting or drilling, may be used.

According to the invention also a tire moulding matrix comprises a plurality of projections on the tread moulding surface of the matrix the projections being for moulding a first, radially outer, and a second, radially inner, pattern in the tread of the tire incorporating at least one main drainage groove, the configuration of at least part of at least one of the said projections changing distinctively at a predetermined level which is substantially parallel to the surface of the matrix for moulding the tread ground-contacting surface of the tire and which is situated at a depth which is a predetermined amount less than the depth of the projection for moulding the main drainage groove, the said second pattern comprising a wholly radial extension of part only of said first pattern.

Embodiments of the invention will now be described by way of example with reference to the accompanying drawings of which:

Figure 1:
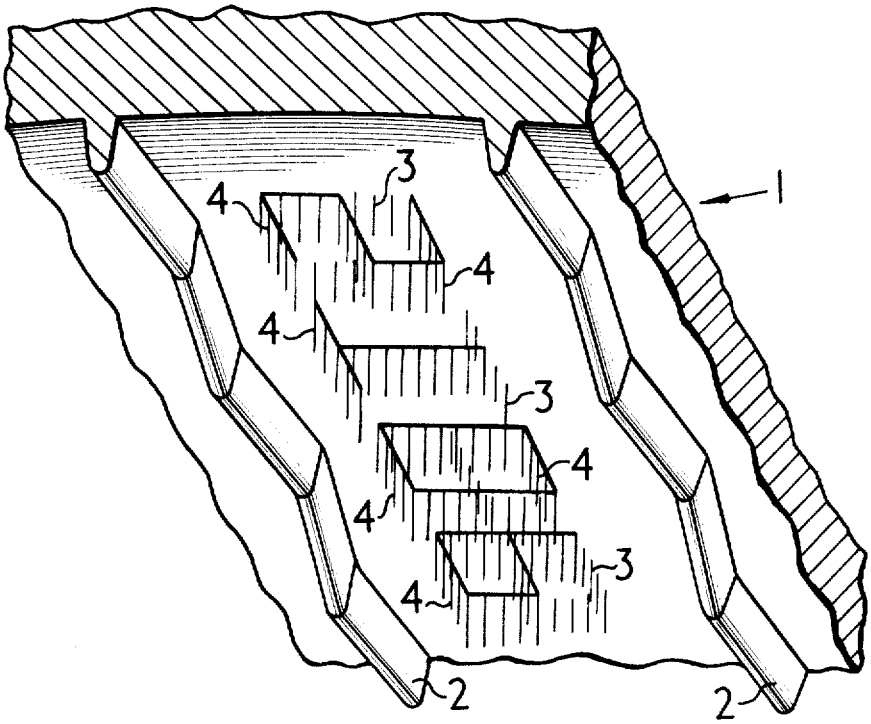
FIG. 1 shows a fragmentary perspective view of a tread moulding matrix according to a first embodiment of the invention.

A first embodiment comprises a pneumatic car tire the tread pattern of which is moulded by a conventional method using a mould comprising a matrix 1 (part of which is shown in FIG. 1) which is provided with a plurality of ribs 2 and pins 3 and 4. The ribs, 8 mm. high and of zig-zag configuration extend generally circumferentially of the mould and form generally circumferential grooves, each 8 mm. deep, in the tire tread. The pins, some (indicated by the reference numeral 3) of which are 6 mm. high and the remainder (indicated by the reference numeral 4) 8 mm. high, form a pattern of holes in the tire tread ribs between the grooves.

The construction of the mould matrix is such that the pins and ribs thereof can be readily withdrawn in a radial direction from the tread of the moulded tire. When 6 mm. i.e. the first pattern, of tread has been worn away in use of the tire that part of the tread pattern formed by the 6 mm. holes disappears leaving only that portion formed by the 8 mm. deep holes, i.e. the second pattern and the grooves. The 8 mm. deep holes form the word STOP repeated round the tire circumference which is not readily apparent in the unworn state of the tire, (being camouflaged by the 6 mm. deep holes) and which warns the motorist that there is only 2 mm. of tread rubber remaining in that area of the tread surface i.e. his tire will soon become unsafe and probably illegal and that he should replace the tire before further wear may render it unsafe to use. Words other than STOP could be used either additionally or alternatively.

In a modified form (not illustrated) of the first embodiment some or all of the pins are enlarged at their extremities so that a bulbous chamber is formed at the base of some or all of the holes formed in the tire tread. Preferably only the 8 mm. pins are enlarged 2 mm. from their ends so that a chamber 2 mm. deep is formed in the tire. Thus when 6 mm. of tread has been worn away a more distinctive pattern appears to warn the motorist. In addition the drainage of a tire tread provided with bulbous chambers is better compared with that of a tire not so provided, especially at the time of the tire's life when only 2 mm. of tread remains.

Figure 2:
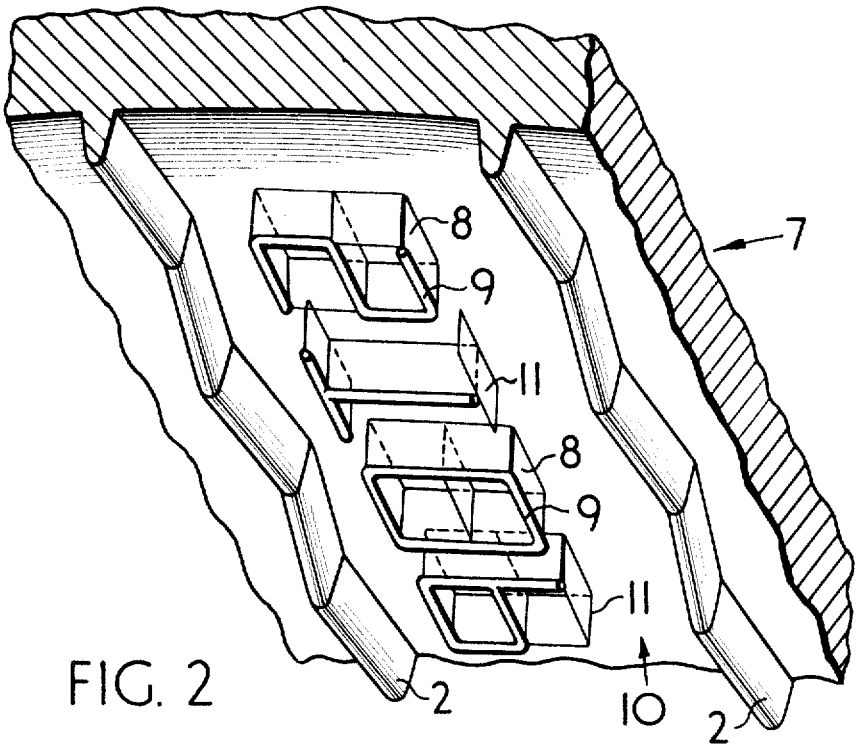
FIG. 2 shows a fragmentary perspective view of a tread moulding matrix according to a second embodiment of the invention.
Figure 3:
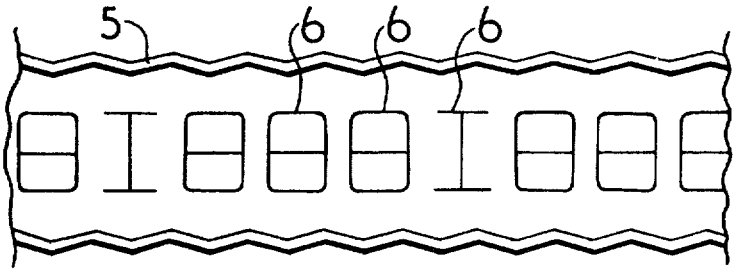
FIG. 3 shows a plan view of part of the first pattern of the tread of a tire according to the second embodiment.
Figure 4:
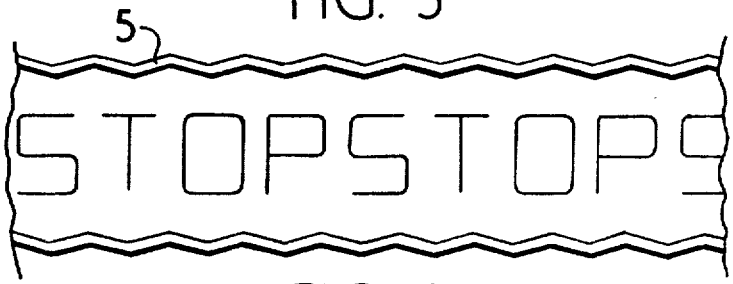
FIG. 4 shows a plan view of part of the second pattern of the tread of a tire according to the second embodiment.

A second embodiment (as shown in FIGS. 2, 3 and 4) of the invention comprises a tire (see FIG. 3) having a tread provided with a plurality of grooves 5 and slots 6 some of the slots or part of each slot opening out into a substantially cylindrical chamber situated radially inwardly of the tread surface with its axis parallel thereto. This tire is moulded by means of a moulding matrix 7 (see FIG. 2) provided with ribs 2 (to form grooves) and knife blades 8 (to form the slots) some of which or part of each of which have joined thereto, e.g. by welding, or have integrally formed therewith a cylindrical portion 9 e.g. a wire or rod, of diameter greater than the thickness of the knife blades. The cylindrical portion 9 wire or rod is bent into the form of a letter in a plane parallel to that surface 10 of the matrix for moulding the ground-contacting surface of the tread, while the knife blade to which it is joined has a similar form with one or more additional features (for example that part of a blade shown as 11 in FIG. 2) so as effectively to disguise the identity of the letter. Several of these blades with the wire letters attached are incorporated in the tire moulding matrix, the several letters forming the mirror image of the warning word STOP. The knife blades thus form the first pattern in the tread while the wires or rods form the second pattern.

In use of a tire moulded in this way when most of the tread has been worn away the chambers appear (as shown in FIG. 4) and because they are wider than the slots and in the form of a warning word should be sufficiently distinctive to cause the motorist to be conscious of the need soon to renew the tire.

In a first modification (not shown) of this second embodiment, the tire tread is provided with a pattern of slots some of which or part of each of which do not open out into chambers but merely are constructed to be deeper than the remainder of each slot or slots. This pattern is moulded using a matrix incorporating knife blades some of which or part of each of which are deeper than the remainder of each blade or the blades. The difference between the two depths of blade or blades can be 2 or 3 mm. i.e. equal to the local minimum allowable tread depth plus an amount to provide a warning of the need to replace the tire without undue delay.

In a second modification (not shown) of the second embodiment the slots and chambers are moulded by means of a matrix provided with knife blades and to which are weakly attached e.g. by means of a weak adhesive or thin textile fibers the aforementioned wire letters. In addition these letters are all wired to each other to form a ring which extends around the internal circumference of the tire mould on the radially inner extremities of the blades.

After moulding and on removal of the moulding matrix from the tire the ring of letters remains embedded in the tire tread, the textile fibers or the adhesive bond having broken during said removal. The ring of letters is removed in a separate operation.

It is an advantage of this modification that the second pattern i.e. the letters may be changed without changing the complete mould matrix.

In a third modification (not shown) of the second embodiment the wires or rods are replaced by U or V channels in which a thin strip of material may be retained during moulding but leaves the channel on removal of the tire from the mould. Thus the moulding operation effectively embeds this strip into the tread rubber at the base of the slot or slots.

The material inserted into the chambers should be such as to make the appearance of the second pattern, when the tread has worn away sufficiently to expose it, even more distinctive. For example, vulcanized or unvulcanized rubber or plastics material may be inserted of a color different from the remainder of the tread rubber. Thus, for example, when sufficient tread has worn away a colored word appears in the tread to warn the motorist of the small amount of tread rubber remaining. Other examples of materials which may be inserted are materials which generate a noise on becoming uncovered when the tread is sufficiently worn, textile cords, or rubber of greater or lesser abrasion resistance than the tread rubber. In this last example the words of rubber will stand proud of or recessed below, respectively, the tread surface. It can be arranged either that the inserted material remains to form part of the wearing surface of the tread or becomes detached under the influence of centrifugal force to leave remaining a recognisable impression in the tread rubber.

Having now described my invention what I claim is:

[1. A pneumatic tire comprising a tread provided with at least one main drainage groove and a first, radially outer, and a second, radially inner, pattern each comprising at least one tread element selected from the group consisting of slots, sipes, grooves, incisions and the like, the first pattern changing to the second pattern at a level situated radially inwardly of and substantially parallel to the tread ground contacting surface of the tire, said level being a predetermined amount less than the depth of the main drainage groove, the second pattern being distinctively different from the first and being located immediately radially inwardly of and in radial alignment with said first pattern.]

[2. A pneumatic tire according to claim 1 wherein the second pattern is substantially undetectable from the exterior of the tire until at least a portion of the tread equal in depth to the first pattern has been worn away.]

[3. A pneumatic tire according to claim 1 wherein the second pattern is in the form of at least one warning word.]

[4. A pneumatic tire according to claim 1 wherein the second pattern is in the form of at least one warning word repeated around the tire circumference.]

[5. A pneumatic tire according to claim 1 wherein the second pattern is in the form of at least one warning word repeated across the tire tread width.]

[6. A pneumatic tire according to claim 1 wherein the second pattern comprises a plurality of chambers.]

[7. A pneumatic tire according to claim 1 wherein the second pattern is at least partially filled with a material distinctively different from the tread rubber.]

[8. A pneumatic tire according to claim 7 wherein the said material comprises a rubber or plastics material of a color different from the tread rubber.]

[9. A pneumatic tire according to claim 7 wherein said material has an abrasion resistance different from that of the tread rubber.]

[10. A pneumatic tire according to claim 1 wherein the second pattern changes to at least one subsequent pattern radially-inwardly thereof.]

[11. A pneumatic tire copmrising a tread provided with at least one main drainage groove and a first, radially outer pattern of no particular visual significance and a second, radially inner, pattern having visual significance, each pattern comprising at least one tread element selected from the group conisting of slots, sipes, grooves, incisions and the like, the first pattern changing to the secnd pattern at a level situated radially inwardly of and substantially parallel to the tread ground-contacting surface of the tire, said level being a predetermined amount less than the depth of the main drainage groove, the second pattern having a lesser number of tread elements than the first pattern with all of the second pattern tread elements being in radial alignment with corresponding elements of the first pattern and located immediately radially inwardly of similar tread elements in the first pattern so that when the first pattern is worn away the second visually significant pattern is exposed.]

12. A pneumatic tire comprising a tread provided with at least one main drainage groove and a first, radially outer, and a second, radially inner, pattern each comprising at least one tread element selected from the group consisting of slots, sipes, grooves, incisions and the like, the first pattern changing to the second pattern at a level situated radially inwardly of and substantially parallel to the tread ground contacting surface of the tire, said level being a predetermined amount less than the depth of the main drainage groove, the second pattern being distinctively different from the first, being located immediately radially inwardly of and in radial alignment with said first pattern, and being in the form of at least one warning word.

13. A pneumatic tire comprising a tread provided with at least one main drainage groove and a first, radially outer, and a second, radially inner, pattern each comprising at least one tread element selected from the group consisting of slots, sipes, grooves, incisions and the like, the first pattern changing to the second pattern at a level situated radially inwardly of and substantially parallel to the tread ground contacting surface of the tire, said level being a predetermined amount less than the depth of the main drainage groove, the second pattern being distinctively different from the first, being located immediately radially inwardly of and in radial alignment with said first pattern, and being in the form of at least one warning word repeated around the tire circumference.

14. A pneumatic tire comprising a tread provided with at least one main drainage groove and a first, radially outer, and a second, radially inner, pattern each comprising at least one tread element selected from the group consisting of slots, sipes, grooves, incisions and the like, the first pattern changing to the second pattern at a level situated radially inwardly of and substantially parallel to the tread ground contacting surface of the tire, said level being a predetermined amount less than the depth of the main drainage groove, the second pattern being distinctively different from the first, being located immediately radially inwardly of and in radial alignment with said first pattern, and being in the form of at least one warning word repeated across the tire tread width.

* * * * *